United States Patent [19]

Tatara

[11] Patent Number: 4,858,886

[45] Date of Patent: Aug. 22, 1989

[54] ELECTROMAGNETIC VALVE

[75] Inventor: Junichi Tatara, Toyota, Japan

[73] Assignee: Aisin Seiki Kabushiki Kaisha, Kariya, Japan

[21] Appl. No.: 176,156

[22] Filed: Mar. 31, 1988

[30] Foreign Application Priority Data

Mar. 31, 1987 [JP] Japan .............................. 62-49597[U]
May 29, 1987 [JP] Japan .............................. 62-85280[U]

[51] Int. Cl.$^4$ .............................................. F16K 31/06
[52] U.S. Cl. ............................ 251/129.07; 251/129.17
[58] Field of Search ........................ 251/129.07, 129.17

[56] References Cited

U.S. PATENT DOCUMENTS 2,596,409  5/1952  Johnson et al. ............ 251/129.17 X
3,606,241  9/1971  Bornholdt ................... 251/129.17 X
4,361,309  11/1982 Sogabe .......................... 251/129.08

FOREIGN PATENT DOCUMENTS 0113679  7/1983  Japan .............................. 251/129.17
1109356  3/1968  United Kingdom ............ 251/129.07

Primary Examiner—Arnold Rosenthal
Attorney, Agent, or Firm—Oblon, Spivak, McClelland, Maier & Neustadt

[57] ABSTRACT

An electromagnetic valve comprises a valve housing including a inlet port and a exhaust port a motor housing disposed therein an electromagnetic mechanism including a solenoid coil, a yoke magnet, a fixed core and a movable core a valve member linearly movable disposed so as to open-close the communication between the inlet port and the outlet port with the movement of the movable core a diaphragm member having an outer periphery secured to between the both housings and an inner periphery secured to the movable core, and defines a back pressure chamber and pressure chambers communicated with the both ports, respectively, in said valve housing. The diaphragm member having an effective sealing area which is substantially equal to an effective sealing area of the valve member. The movable core is provided with a passage means which communicates between the inlet port and the back pressure chamber when the valve member is closed position.

2 Claims, 4 Drawing Sheets

ELECTROMAGNETIC VALVE

BACKGROUND OF THE INVENTION

1. Field of the Prior Art

This invention relates to an electromagnetic valve and more particularly to an electromagnetic valve for linearly controlling the flow quantity between the inlet port and the exhaust port in response to an electric current applied to the electromagnetic mechanism from an electric control circuit.

2. Description of the Prior Art

A typical electromagnetic valve of this type is disclosed, for example, in U.S. Pat. No. 4,493,474. This typical electromagnetic valve includes a valve housing having a first chamber opened an inlet port and a second chamber opened an exhaust port, a shaft member movable disposed toward to an axial direction in response to an electric current applied the electromagnetic mechanism from an electric control circuit in a motor housing and the valve housing, a valve member movable disposed so as to open and close the communication between the inlet port and the exhaust port with the movement of the shaft member. A pressure balance mechanism comprising a bellows member is disposed in a concentric configuration to the shaft member in both housings. The bellows member is airtightly fixed at its both end portions between both housings and the valve member, respectively and forms an airtight chamber. The airtight chamber is communicated with the second chamber through a passage means formed in the valve member.

In this prior art, when the valve member is closed by a spring load, since the pressure in the second chamber equalizes to the pressure in the bellows member, the pressure difference between both chambers does not operate the valve member so as to urge the valve member toward to the opening position or the closing position. Therefore, in this electromagnetic valve, it is not necessary to generate a large linear attraction force in the electrtomagnetic mechanism and it is possible to be minimized the size of the electromagnetic mechanism.

In the above typical electromagnetic valve, however, since the pressure balance mechanism comprises a bellows member, it is necessary to increase the size of a bellows portion of the bellows member in order to be minimize the force for moving the bellows member in the axial direction. As a result, the size of the electromagnetic valve becomes large in the axial direction. Furthermore, since it is necessary to minimize the thickness of the bellows member, a special and expensive material, for example, such as Teflon, is necessary as the material fo the bellows member. As a result, the electromagnetic valve becomes expensive. Furthermore, since the valve member is fixed to the one end of the shaft member, it is not able to ensure the airtightness of the valve member. Therefore, it is necessary to improve the accuracy of the finished size of a valve seat portion of the valve housing and the valve member, so that there is a drawback that the cost for manufacturing the electromagnetic valve becomes expensive.

SUMMARY OF THE INVENTION

It is, therefore, an object of the present invention to provide an improved electromagnetic valve which is compact and inexpensive.

It is another object of the present invention to improve the performance of the airtightness of the valve member of the electromagnetic valve.

To achieve the above objects and advantages, and in accordance with the purpose of the invention, as embodied and broadly described herein, the electromagnetic valve comprises a valve housing including an inlet port and an exhaust port, a motor housing having disposed therein electromagnetic mechanism including a solenoid coil, a magnetic yoke, a fixed core and a movable core, a valve member linearly movable disposed so as to open and close the communication between the inlet port and the exhaust port in response to the movement of the movable core, a diaphragm member having an outer periphery secured between both housings and an inner periphery secured to the movable core. The diaphragm member defines a back pressure chamber and pressure chambers communicated with the both ports, respectively, and having an effective sealing area which is substantially equal to an effective sealing area of the valve member. The movable core is provided with a passage means which communicates between the inlet port and the back pressure chamber when the valve member is in a closed position.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENT

An electromagnetic valve constituted in accordance with a preferred embodiment of the present invention will be described with reference of the drawings.

Figure 1:
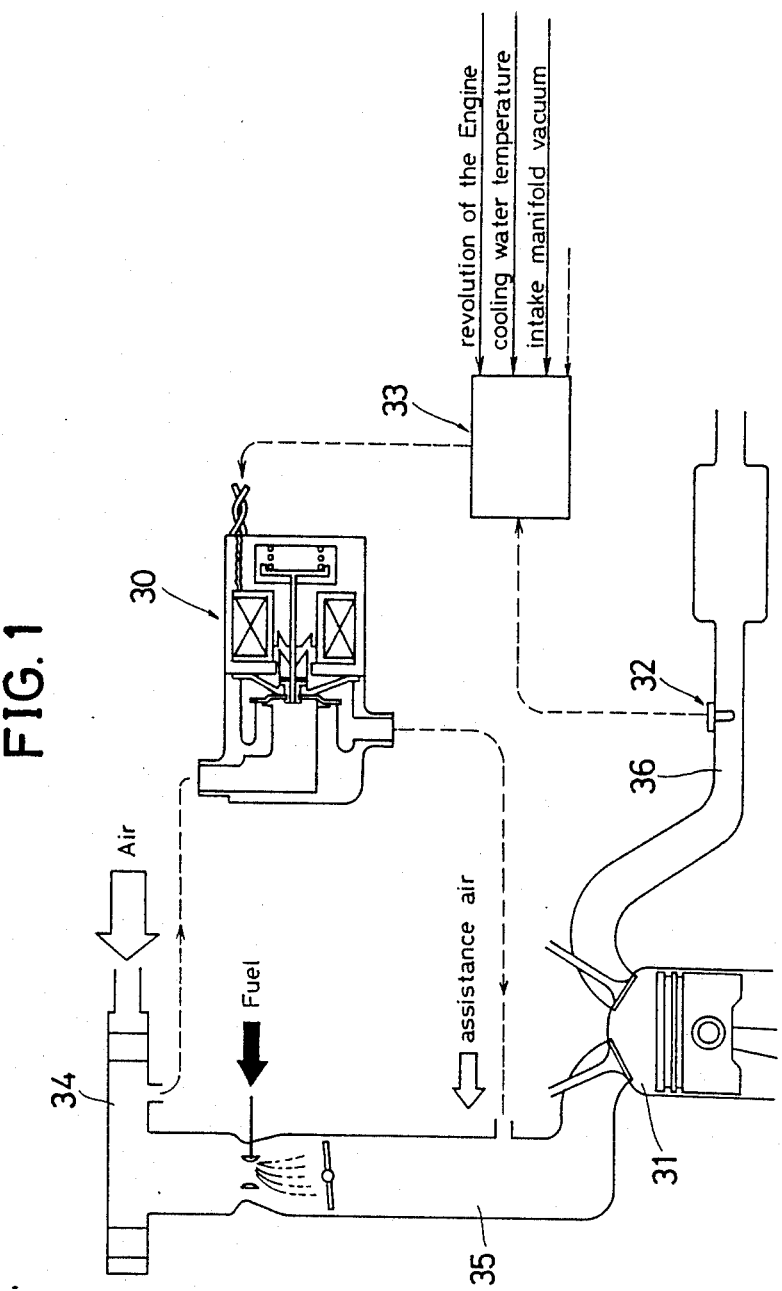
FIG. 1 is a block diagram of an air-fuel ratio control system adapting the electromagnetic valve of the present invention.

With reference to FIG. 1, there is illustrated an air-fuel ratio control system which adopts an electromagnetic valve 30 of the present invention. In this control system, the amount of valve opening of the electromagnetic valve 30 is adjusted by the signal from an electric control circuit 33 in response to the variation of the detecting signal of the oxygen sensor 32 which detects the percentage oxygen in the combustion gas in the exhaust manifold 36 and the condition of engine running. As a result, the air from the air cleaner 34 is supplied into the mixture air in the intake manifold 35, and is mixed with the assistance air so that the air-fuel ratio of the mixture air in the intake manifold 35 approaches the stiochiometric air-fuel ratio.

Figure 2:
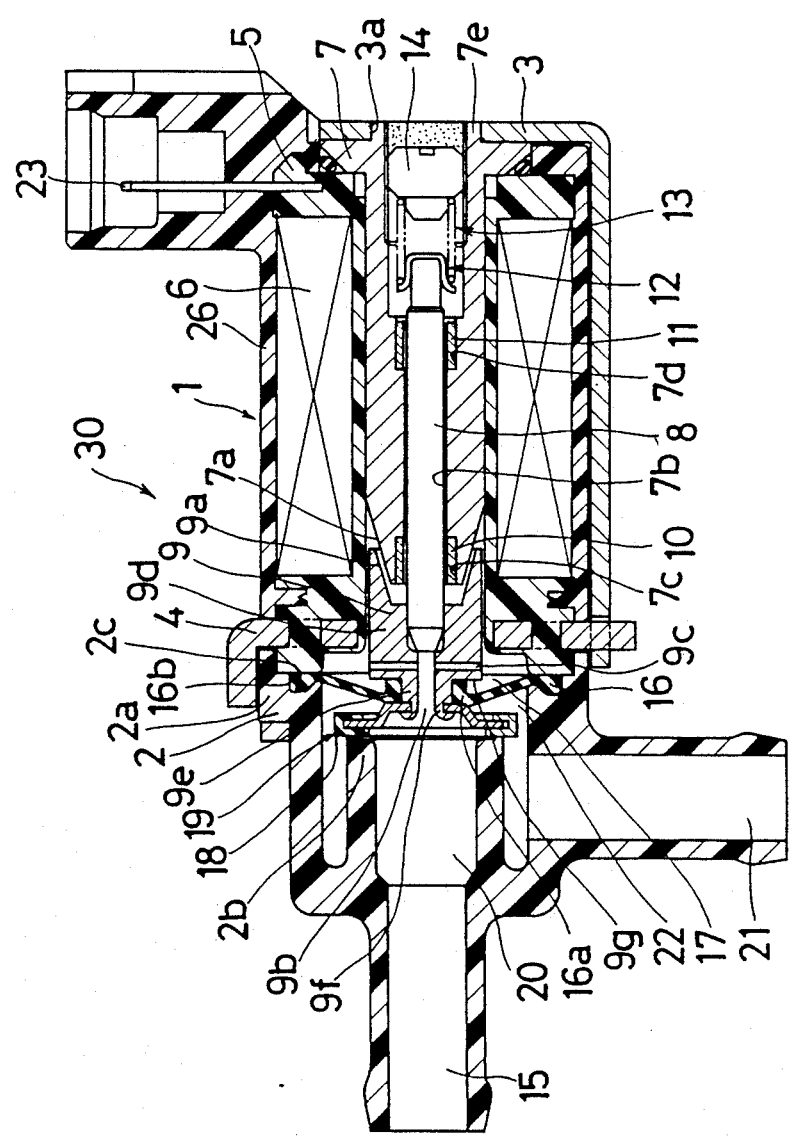
FIG. 2 is a cross-sectional view of the one embodiment of the electromagnetic valve of the present invention.

With now reference to FIG. 2, there is illustrated the electromagnetic valve 30 which includes a motor housing 1 and valve housing 2. Both housings 1, 2 are secured through a yoke 3 made from a magnetic material and a yoke 4 made from a magnetic material and united with the yoke 3 so as to become a one body. A solenoid coil 6 which is wound around a bobbin 5 is disposed in the motor housing 1 and a fixed core 7 is fixed in a hole of the bobbin 5. The fixed core 7 is formed into a cylindrical shape and a shaft member 8 made from a non-magnetic material is slidably fitted into a hole 7b of the fixed core 7 on the coaxial line thereof. The fixed core 7 is made from a magnetic material and is provided with a tubular extension 7e at its right end. The fixed core 7 is also provided with an annular extension 7a which is a taper shape at its left end. The bearings 10, 11 are securely fitted into the circular grooves 7c, 7d which are formed in both ends of a hole 7b of the fixed core 7. The bearings 10, 11 are made from a non-magnetic material and supported on the shaft member 8 so as to be able to fleely slide in both axial directions. A movable core 9 is secured to the one end of the shaft member 8 and is provided with an annular projection 9a which has a taper shape surface confronting the taper portion of the projection 7a at its right end. The yoke 4 is insert-molded with the bobbin 5 so as to be secured with the motor housing 1 permanently and is caulked to a flange portion 2a of the valve housing so as to secure both housings 1, 2. The yoke 3 which is made from a magnetic material is held on the motor housing 1 and is formed into a U-shape. The yoke 3 is provided witha hole 3a which is fitted onto the tubular extension 7e at its right end and caulked to the yoke 4 at its left end.

In such assembling procedure the solenoid coil G is would around the bobbin 5 in surrounding relationship with the fixed core 7. As a result, an electromagnetic mechanism is constituted by the magnetizable yoke 3, the yoke 4, the solenoid coil 6, the fixed core 7, the shaft member 8 and the movable core 9 in the motor housing 1. The shaft member 8 is received by a spring holder 12 made from a non-magnetic material at its right end and is loaded toward the valve housing 2 by a compression coil spring 13 which is interposed between the spring holder 12 and an adjusting screw 14 threaded into a large bore portion of the hole 7b of the fixed core 7, the pre-loading of spring 13 being adjustable by the screw 14. A connector terminal 23 is connected at one end of the solenoid coil 6 and extends externally through a cover member 26 of synthetic resin material to be connected to an electric control circuit.

The movable core 9 is formed in a cylindrical shape and the one end of the shaft member 8 is secured into its large bore portion. The movable core 9 is provided with a large diameter portion 9d and a small diameter portion 9e and further provided with a projection portion 9f which projects from the one end of the small diameter portion 9e. Furthermore, the movable core 9 is provided with a first communication passage 9b on its axial center. The movable core 9 is also provided with four second communication passages 9c which radially extend from the first communication passage 9b and which communicate with the first communication passage 9b.

The valve housing 2 includes a inlet and exhaust ports 15 and 21 and further includes a valve seat portion 2b which has a constant area. The interior of the valve housing 1 is subdivided into first and second chambers 20 and 22, respectively, in open communication with the inlet and exhaust ports 15 and 21. A valve member 19 in the form of a disc member is secured to the projection portion 9f of the movable core 9 to cooperate with the valve seat portion 2b so as to control the flow of fluid between both chambers 20, 22. The valve member 19 is provided with an annular seal member 18 which is assembled with the outer peripheral portion of the disc member and which has a constant sealing area corresponding to the area of the valve seat portion 2b. The seal member 18 is contactable with the valve seat portion 2b.

A diaghragm member 16 made from a synthetic rubber is airtightly secured at its inner end portion 16a to the outer surface of the samll diameter portion 9e of the movable core by its elastic force and its outer end portion 16b between the annular groove 2c of the valve housing 2 and the bobbin 5 by the caulking of the yoke 4. The diaphragm member 16 includes an substantially equivalent sealing area as regard to the sealing area of the valve member 19. As a result, a back pressure chamber 17 which is communicated with the first chamber 20 through the first and second communication passages 9b and 9c is formed in the inner space of the second chamber 22 when the valve member 19 is in engagement with valve seat portion 2b.

In operation, the valve member 19 is in engagement with the valve seat portion 2b under the pre-loading of the spring 13 during deenergization of the solenoid coil 6. When the solenoid coil 6 is energized, an electric current applied to the solenoid coil 6 from the electric control circuit generates a linear attraction force between the yoke 4 and the outer periphery of the movable core 9 and also between the annular recess 7a of the fixed core 7 and the annular projection 9a of the movable core 9 in response to the electric current applied to the solenoid coil 6. The linear attraction force thus acts to move the movable core 9 rightwardly against the pre-loading of the spring 13 so as to disengage the value member 19 from the valve seat portion 2b and so the fluid flows between both ports 15, 21. In such operation, if the negative pressure is applied into the first chamber 20 and the positive pressure or atmosphere is applied into the second chamber 22 during deenergization of the solenoid coil 6, a pressure force by the pressure difference between both chambers 20, 22 acts to move the valve member 19 leftwardly. As a result, a large linear attraction force would be required so as to move the valve member 19 rightwardly against the pressure force and the solenoid coil becomes large. In this embodiment, however, since the back pressure chamber 17 which is formed in the second chamber 22 is communicated with the first chamber 20 through both passages 9b, 9c, no pressure force acts to move the valve member 19 leftwardly. Accordingly, in this embodiment, the linear attraction force need only resist spring 13 and it is not necessary to increase the size of the solenoid coil. It is possible to minimize the size of the electromagnetic valve and to decrease the strength of the electromagnetic valve in the axial direction without influencing the pressure at the ports or the area of the valve seat portion. Furthermore, since the diaphragm 16 maintains the airtightness between both housings 1, 2, it is able to decrease fluid leakages to or from the electromagnetic valve, and since the pressure balance mechanism comprises a diaphragm member 16 made from a synthetic rubber, it is possible to cheapen the cost of the electromagnetic valve. Also even if the negative pressure is applied into the first chamber 22 and the positive pressure or atmosphere is applied into the second chamber 20 during deenergization of the solenoid coil 6, the same effect is obtained.

Figure 3:
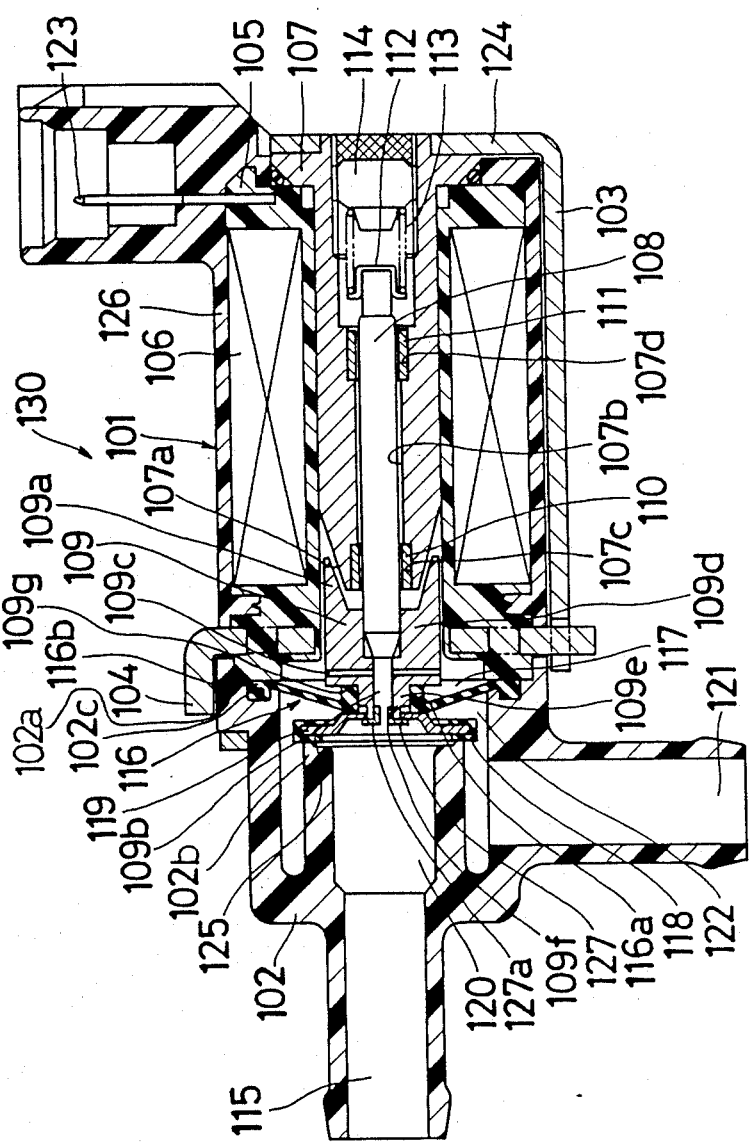
FIG. 3 is a cross-sectional view of the another embodiment of the electromagnetic valve of the present invention.

Reference is now to FIG. 3 showing another embodiment of the present invention. Those parts which correspond to the constituents of the embodiment shown in FIG. 2 are indicated by the same numbers in FIG. 2 but are in one hundred series. In this other embodiment of the present invention, the valve member 119 is loosely assembled to the projection portion 109f so as to be movable on the projection portion 109f by a predetermined stroke and is maintained by fitting a plug member 127 into the first communication passage 109b, which valve member is able to incline in regard to the movable core 109. The inner end portion 116a of the diaphragm 116 is airtightly fitted onto the small diameter portion 109e between the valve member 19 and the stepped portion 109g so as to fill up said stroke, and so resiliently urges the valve member 119 toward a flange portion 127a of the plug member 127. The valve member 119 is thus pivotably movable in regard to the movable core 109 against the elastic force of the inner end portion 116a of the diaphram 116, which comprises means for permitting the valve member to move and pivot so as to airtightly seal the valve seat portion.

According to this another embodiment, even if the variance of the degree of the flatness of the valve seat portion 102a is large, since the valve member 119 is able to incline, i.e., pivot, in regard to the movable core 109, the valve member 119 is able to engage with the valve seat portion 102a due to the urging of the elastic force of the inner end portion of the diaphram 116. As a result, the performance of the airtightness of the valve member 119 of the electromagnetic valve is improved without a need to improve the accuracy of the finish of the valve seat portion of the valve housing. So that it is possible to decrease the cost for manufacturing the electromagnetic valve. In this another embodiment, other structure is the same as the embodiment shown by FIG. 2 and the other effects are the same as the embodiment shown by FIG. 2 too.

Figure 4:
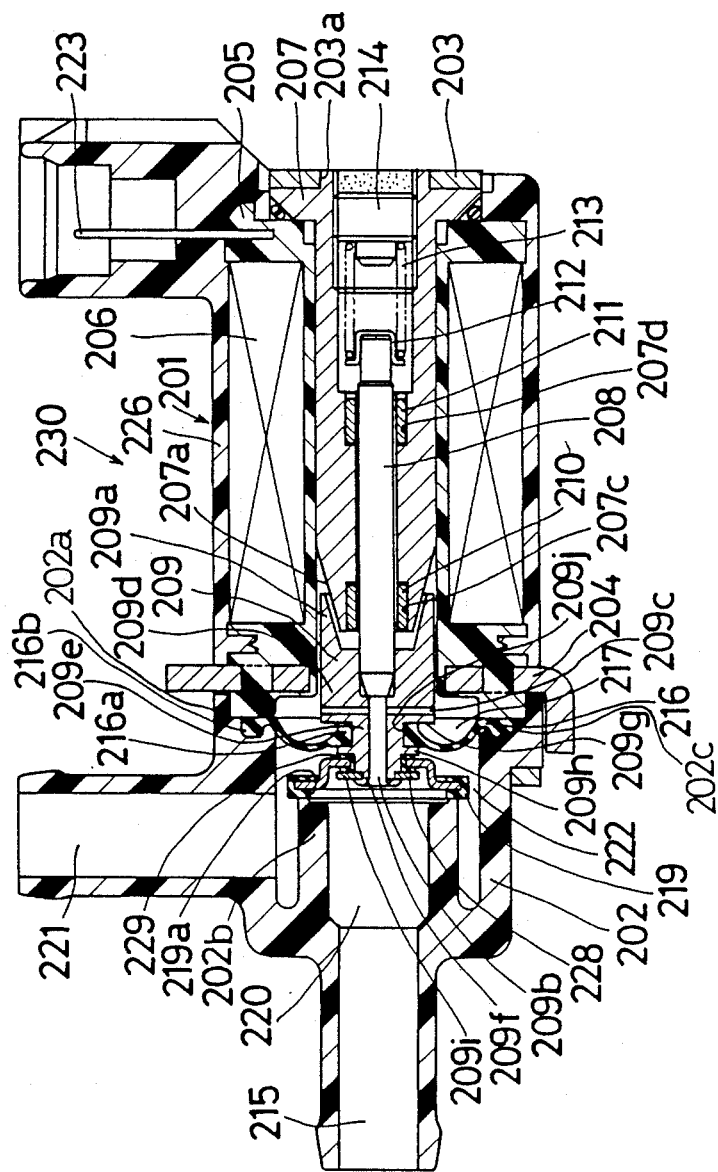
FIG. 4 is a cross-sectional view of the another embodiment of the electromagnetic valve of the present invention.

Reference is now made to FIG. 4 showing another embodiment of the present invention. Those parts which correspond to the constituents of the embodiment shown in FIG. 2 are indicated by the same numbers in FIG. 2 but are in two hundred series. In this embodiment of the present invention, a plate member 228 is secured to the projection portion 209f of the movable core 209. Furthermore, a flange portion 209h is formed in the small diameter portion 209c. As a result, a first annular groove 209i is formed between the plate member 228 and the flange portion 209h and a second annular groove 209j is formed between the flange portion 209h and the stepped portion 209g. An elastic member 229 is attached to the rear portion 219a of the valve member 219 and the inner periphery of the elastic member 229 is airtightly fitted into the first annular groove 209i so that the valve member is relatively the first annular groove 209i by a predetermined stroke to maintain airtightness while being able to incline or pivot relative to the movable core 209. The inner end portion 216a of the diaphragm 216 is airtightly fitted into the second annular groove 209j.

According to this embodiment, even if the variance of the degree of the flatness of the valve seat portion 202a is large, since the valve member 219 is able to incline in regard to the movable core 209, the valve member 119 is able to engage with the valve seat portion 202a due to the urging of the elastic force of the elastic member 229 which thus comprises means for permitting the valve member to move relative to the movable core and to pivot so as to airtightly seal the valve seat portion. As a result, the performance of the airtightness of the valve is improved member 219 of the electromagnetic valve without a need to improve the accuracy of the finish of the valve seat portion of the valve housing. So that it is possible to decrease the cost for manufacturing the electromagnetic valve. In this other embodiment, other structure is the same as the embodiment shown by FIG. 2 and the other effects of the same as the embodiment shown by FIG. 2 too.

Having now fully set forth both structure and operation of the preferred embodiments of the present invention, various other embodiments as well as certain various modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. An electromagnetic valve comprising:
   a valve housing including an inlet port, an exhaust port and a valve seat portion;
   a motor housing fixed to said valve housing;
   an electromagnetic mechanism in said motor housing and including a solenoid coil, a magnetic yoke connecting ends of said solenoid coil, and fixed and movable cores within said solenoid coil;
   a valve member movably mounted on said movable core at a position for closing said valve seat portion;
   an elastomeric diaphragm member having an outer periphery air tightly secured between said valve and motor housings to define a back pressure chamber and having an inner periphery air tightly secured to said movable core at a position where the material of said inner periphery of said diaphragm member elastically presses on said valve member, wherein the elastic pressure of said inner periphery of said diaphragm member comprises means for permitting said valve member to move relative to said movable core and pivot so as to airtightly seal said valve seat portion; and
   passage means in said movable core for communicating said back pressure chamber with a pressure at said inlet port.

2. An electromagnetic valve comprising:
   a valve housing including an inlet port, an exhaust port and a valve seat portion;
   a motor housing fixed to said valve housing;
   an electromagnetic mechanism in said motor housing and including a solenoid coil, a magnetic yoke connecting ends of said solenoid coil, and fixed and movable cores within said solenoid coil;
   a valve member mounted on said movable core at a position for closing said valve seat portion via an elastic member comprising means for permitting said valve member to move relative to said movable core and pivot so as to airtightly seal said valve seat portion;
   a diaphragm member having an outer periphery air tightly secured between said valve and motor housings to define a back pressure chamber and having an inner periphery air tightly secured to said movable core; and
   passage means in said movable core for communicating said back pressure chamber with a pressure at said inlet port.

* * * * *